(12) United States Patent
Kamiko et al.

(10) Patent No.: US 10,222,991 B2
(45) Date of Patent: *Mar. 5, 2019

(54) MEMORY UPDATING IN A DUAL-PORTED INTERNAL MEMORY WITH CONCURRENT TRANSFER AND RETRIEVAL

(71) Applicant: Lantiq Beteiligungs-GmbH & Co. KG, Neubiberg (DE)

(72) Inventors: Taro Kamiko, Singapore (SG); Yao Chye Lee, Singapore (SG); Ganesha Nayak, Singapore (SG); Jin Sze Sow, Singapore (SG)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 285 days.

This patent is subject to a terminal disclaimer.

(21) Appl. No.: 14/836,632

(22) Filed: Aug. 26, 2015

(65) Prior Publication Data

US 2016/0054918 A1 Feb. 25, 2016

Related U.S. Application Data

(63) Continuation of application No. 11/814,914, filed as application No. PCT/SG2005/000020 on Jan. 26, 2005, now Pat. No. 9,146,865.

(51) Int. Cl.
*G06F 3/06* (2006.01)
*G06F 12/06* (2006.01)
*G06F 12/08* (2016.01)

(52) U.S. Cl.
CPC ............ *G06F 3/061* (2013.01); *G06F 3/0638* (2013.01); *G06F 3/0647* (2013.01); *G06F 3/0653* (2013.01); *G06F 3/0683* (2013.01); *G06F 12/0623* (2013.01); *G06F 12/08* (2013.01); *G06F 2212/251* (2013.01); *G06F 2212/253* (2013.01)

(58) Field of Classification Search
None
See application file for complete search history.

(56) References Cited

U.S. PATENT DOCUMENTS 4,713,759 A 12/1987 Yamagishi et al.
5,752,261 A 5/1998 Cochcroft, Jr.
(Continued)

FOREIGN PATENT DOCUMENTS

EP 0841619 A2 5/1998

OTHER PUBLICATIONS

"Page Allocation Control," IBM Technical Disclosure Bulletin, Jan. 1990, pp. 334-337, vol. 32, No. 8A.

*Primary Examiner* — Kevin Verbrugge
(74) *Attorney, Agent, or Firm* — Eschweiler & Potashnik, LLC

(57) ABSTRACT

There is provided a method for updating an internal memory on a semiconductor device from an external memory. The external memory is arranged in a plurality of data portions. The method comprises the steps of writing a first data portion from the external memory to the internal memory, processing the first data portion and, while the first data portion is being processed, once a selected data item is processed, starting to write a second data portion from the external memory to the internal memory. The method may be applied to the processing of software by an embedded processor on a semiconductor device. There is also provided a semiconductor device and a hardware module for the semiconductor device.

44 Claims, 1 Drawing Sheet

(56) References Cited

U.S. PATENT DOCUMENTS

| | | |
|---|---|---|
| 5,895,469 A | 4/1999 | Lahti et al. |
| 6,184,904 B1 | 2/2001 | Trummer et al. |
| 6,247,042 B1 | 6/2001 | Engstrom et al. |
| 6,377,979 B1 | 4/2002 | Yamashita et al. |
| 6,393,525 B1 | 5/2002 | Wilkerson et al. |
| 2003/0005212 A1 | 1/2003 | Cocca |
| 2006/0075394 A1 | 4/2006 | Iwamoto |
| 2009/0240847 A1 | 9/2009 | Hu |
| 2009/0300366 A1 | 12/2009 | Gueller et al. |

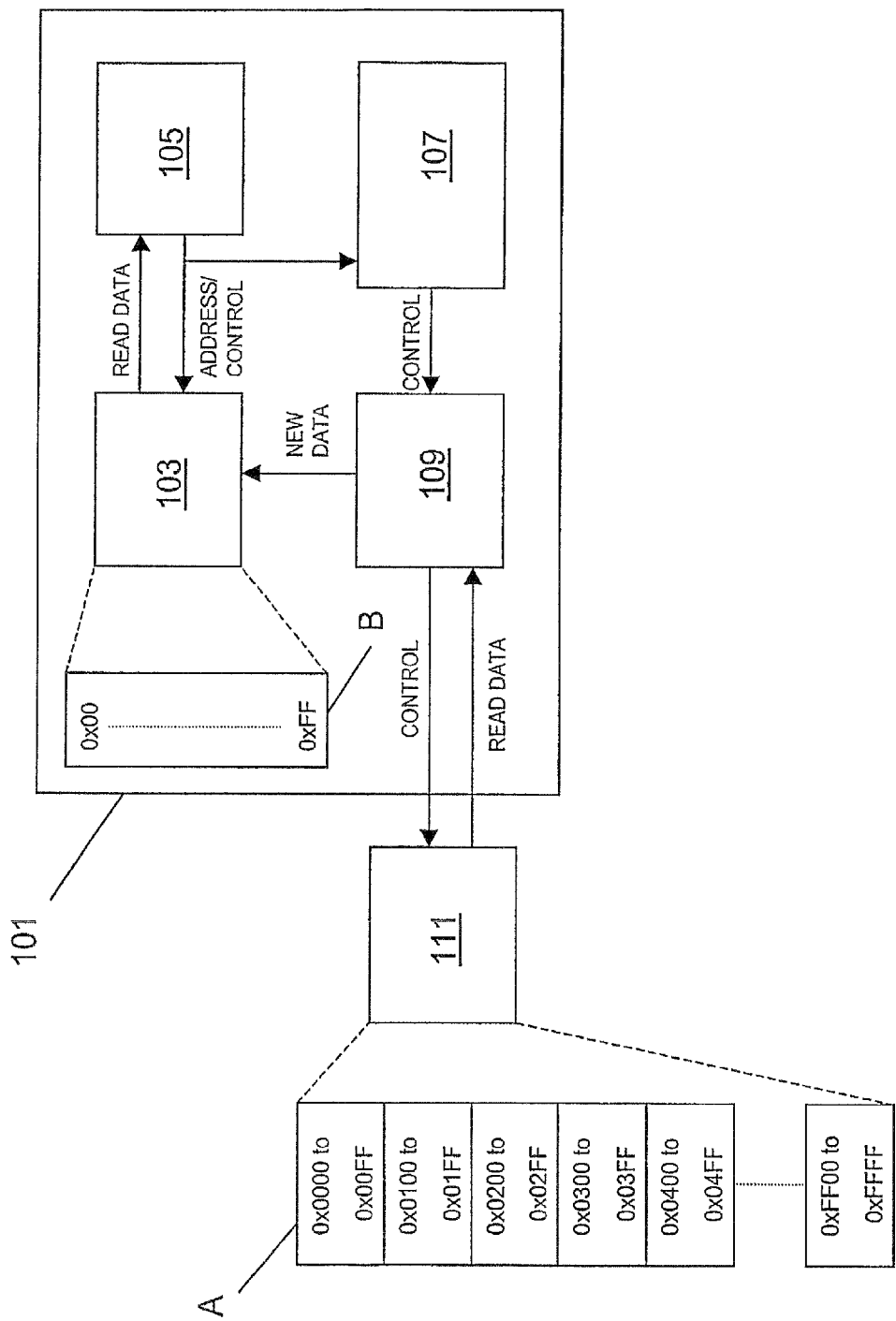

MEMORY UPDATING IN A DUAL-PORTED INTERNAL MEMORY WITH CONCURRENT TRANSFER AND RETRIEVAL

CROSS-REFERENCE TO RELATED APPLICATIONS

This application is a continuation application of U.S. application Ser. No. 11/814,914. U.S. application Ser. No. 11/814,914 is a national stage entry of PCT/SG2005/000020 having an international application date of Jan. 26, 2005, entitled, "Improvements in and relating to memory updating". The entire disclosure of the prior application is considered part of the disclosure of this application and is hereby incorporated by reference.

FIELD OF THE INVENTION

The invention relates to updating semiconductor device internal memory from external memory. Particularly, but not exclusively, the invention relates to updating semiconductor device internal memory with software from an external memory for an embedded processor to read the software from the internal memory.

BACKGROUND OF THE INVENTION

Embedded processors within a semiconductor device require software which may be read from an internal or an external memory.

Internal memory is advantageous because it can be accessed more quickly than external memory, as it can be directly connected to the processor bus. Thus, internal memory should be used when fast access speed is required. However, the larger the internal memory, the larger the size of the silicon chip which, of course, affects manufacturing costs. So, in practice, the internal memory size must be kept small, even though this limits the features which can be implemented in the internal memory software. That is, a compromise has to be found between fast access and small chip size.

For external memory, on the other hand, the size of the memory has no affect on silicon chip size. However, an external memory requires more cycles in order to be accessed through internal bus bridges, a memory controller, an external system bus and so on. Thus, external memory can be used when the software is too big for internal memory and/or when particularly fast access is not required.

To partially solve the problems associated with using an external memory, processor cache memory has been introduced. A cache memory provides fast access for data which is frequently accessed, whilst reserving the less frequently accessed data in the external memory. The disadvantage of cache memory, however, is that the cache memory will only be updated when a cache miss happens i.e. when a read request cannot be satisfied by the cache memory but requires the external memory. This updating process takes extra cycles.

SUMMARY OF THE INVENTION

In an embodiment of the invention, a method for updating an internal memory on a semiconductor device from an external memory, which mitigates or substantially overcomes the problems of prior art methods described above is provided. In a further embodiment of the invention, hardware is provided for updating an internal memory on a semiconductor device from an external memory.

In general terms, the invention provides that data from an external memory be written to an internal memory in segments or modules. The processor reads the data in the first module and, when the processor reaches a selected data item in the module, a memory controller is instructed to start to load the next module of data from the external memory to the internal memory. Thus, the internal memory is updated dynamically as required.

According to a first aspect of the invention, there is provided a method for updating an internal memory on a semiconductor device from an external memory, data in the external memory being arranged for flow in a plurality of data portions, the method comprising the steps of:
  writing a first data portion from the external memory to the internal memory;
  processing the first data portion; and
  while the first data portion is being processed, once a selected data item is processed, starting to write a second data portion from the external memory to the internal memory.

The invention makes use of both internal memory and external memory. The internal memory is constantly updated from the external memory as the data in the internal memory is processed. This is achieved by arranging the data in the external memory in a plurality of data portions which may be loaded into the internal memory individually. As one data portion is processed, the next data portion can be loaded at an appropriate stage determined by the selected data item. The updating of the internal memory occurs at the same time as the processing of the data in the internal memory so that processing is not interrupted.

In one embodiment, the method further comprises the step of, while the first data portion is being processed, monitoring the processing for the selected data item. Monitoring the processing ensures that the second data portion is loaded to the internal memory at an appropriate stage.

In that embodiment, the step of monitoring the processing for the selected data item may comprise a hardware module monitoring the processing for the selected data item. The hardware module may be arranged to instruct the start of the writing of the second data portion once the selected piece of data is processed.

The step of writing a first data portion from the external memory to the internal memory is preferably performed by a memory controller. In order to write the first data portion from the external memory to the internal memory, the memory controller is preferably arranged to read data from the external memory and to write data to the internal memory.

The step of starting to write a second data portion from the external memory to the internal memory is preferably performed by a memory controller. In order to write the second data portion from the external memory to the internal memory, the memory controller may be arranged to read data from the external memory and to write data to the internal memory.

The memory controller may be on the semiconductor device. The hardware module may be on the semiconductor device.

In an embodiment where the method comprises the step of monitoring the processing and the monitoring is performed by a hardware module, the hardware module may be arranged to instruct the memory controller to start to write the second portion of data to the internal memory, once the selected data item is processed.

The step of processing the first data portion is preferably performed by a processor. The processor may be on the semiconductor device.

In one preferred embodiment, each data portion in the external memory is substantially the same size as the internal memory. Thus, the entire data portion in the external memory can be written to the internal memory in one go (but not necessarily in a single clock cycle).

Each data portion in the external memory may be defined by a set of external data addresses. Data in the internal memory may be defined by a set of internal data addresses. Preferably the total range of external data addresses is larger than the range of internal data addresses.

Each set of external data addresses (that is, the external data address range of each data portion) is preferably substantially the same size as the set of internal data addresses.

In that case, each external data address may be defined by x bits and each internal data address may be defined by (x-y) bits. x and y are positive integers so that each internal data address is defined by fewer bits than each external data address.

In that case, the step of writing a first data portion from the external memory to the internal memory may include discarding y bits of the data address. Thus, no reassigning of addresses between the external memory and the internal memory is required. This is done automatically by discarding the excess y bits.

Also in that case, the step of processing the first data portion may comprise the steps of: a processor trying to read, for each data item in the first data portion, an address defined by x bits; converting the address defined by x bits to an internal memory address defined by (x-y) bits, by discarding the y most significant bits of the data address; and the processor reading, for each data item in the first data portion, the internal memory address defined by (x-y) bits. Thus, no reassigning of addresses is required in order for the processor to be able to read the correct address, even though the processor has an instruction fetch to read an x-bit address, but the internal memory only has (x-y)-bit addresses. The step of converting preferably takes place in the internal memory, the internal memory automatically discarding y bits because the number of bits defining the address which the processor is trying to read is too large.

In one embodiment, the data in the external memory is defined by external data addresses from 0X0000 to 0XFFFF (i.e. x=16) and the data portions in the external memory are defined by the following sets of external data addresses: 0X0000 to 0X00FF, 0X0100 to 0X01FF, 0X0200 to 0X02FF and so on. In that embodiment, the data in the internal memory is defined by internal data addresses from 0X00 to 0XFF (i.e. x-y=8). Thus, each data portion in the external memory is the same size as the internal memory.

Preferably, every data portion in the external memory, irrespective of its external data address set, is mapped to one set of internal data addresses in the internal memory. Thus, to convert from the data portion's external memory address to the internal memory address, some of the bits defining the address can simply be discarded. In that way, when each data portion is written from the external memory to the internal memory, no compiler effort is required in order to reassign addresses.

The selected data item is preferably defined by one or more of the internal data addresses in the set. The one or more internal data addresses defining the selected data item will be equivalent to one or more external data addresses in the set of external data addresses for that data portion. The one or more internal data addresses defining the selected data item may be set by a user. The one or more of the internal data addresses defining the selected data item may be termed a threshold address. The threshold address may be the same for all the data portions or the threshold address may be different for different data portions.

In one embodiment of the invention, the first and second data portions are defined by a respective set of external data addresses, the second set of external data addresses following sequentially the first set of external data addresses.

In another embodiment of the invention, the first and second data portions are defined by a respective set of external data addresses, the second set of external data addresses not following sequentially the first set of external data addresses. In this embodiment, the first data portion may include data on the external data address set of the second data portion. Where a memory controller is provided to write the data portions from the external memory to the internal memory, the memory controller may be instructed to load the second data portion, as defined by the second set of external data addresses, once the selected data item is processed.

The method may further comprise the steps of:
  completing writing the second data portion from the external memory to the internal memory;
  processing the second data portion; and
  while the second data portion is being processed, once a second selected data item is processed, starting to write a third data portion from the external memory to the internal memory.

The method may additionally comprise the step of, while the second data portion is being processed, monitoring the processing for the second selected data item. The step of monitoring the processing for the second selected data item may comprise the hardware module monitoring the processing for the second selected data item. The step of processing the second data portion may comprise the processor processing the second data portion.

The steps of the method of the invention as described above may be repeated until all data portions in the external memory have been written to the internal memory. That is, the first data portion is written to the internal memory and processed, the second data portion is written to the internal memory and processed, the third data portion is written to the internal memory and processed and so on until the nth data portion has been processed. The method may be repeated from the first data portion once all the data portions have been written to the internal memory. Or, the method may be repeated from the first data portion before all the data portions have been written to the internal memory.

The method may be advantageously applied to the processing of software by an embedded processor on a semiconductor device, for example, a silicon chip.

According to the first aspect of the invention, there is also provided a method for updating an internal memory on a semiconductor device with software from an external memory, the software in the external memory being arranged to be loaded into the internal memory in a plurality of software portions, the method comprising the steps of:
  writing a first software portion from the external memory to the internal memory, the first software portion being defined in the external memory by a first set of external memory addresses and, once written to the internal memory, being defined in the internal memory by a set of internal memory addresses;
  processing the first software portion; and
  while the first software portion is being processed, once a selected software address is processed, starting to write a second software portion from the external memory to the internal memory, the second software portion being defined in the external memory by a second set of external memory addresses and, once written to the internal memory, being defined in the internal memory by the set of internal memory addresses.

According to a second aspect of the invention, there is provided a semiconductor device for operation with an external memory, data in the external memory being arranged for flow in a plurality of data portions, the semiconductor device comprising:
   an internal memory for storing a data portion;
   a memory controller for writing data from the external memory to the internal memory;
   a processor for processing the data portion in the internal memory; and
   a hardware module arranged, once a selected data item in a first data portion is processed, to instruct the memory controller to write a second data portion from the external memory to the internal memory.

The invention makes use of both internal memory and external memory. The internal memory on the semiconductor device is constantly updated from the external memory as the data in the internal memory is processed. This is achieved by arranging the data in the external memory in a plurality of data portions which may be loaded into the internal memory individually. As one data portion is processed, the next data portion can be loaded at an appropriate stage determined by the selected data item. The internal memory is preferably a dual port memory so that the updating of the internal memory can occur at the same time as the processing of the data in the internal memory so that processing is not interrupted. The arrangement allows the internal memory on the semiconductor device to be kept small thereby preventing an increase in manufacturing costs.

Preferably, the hardware module is arranged to monitor the processing for the selected data item. Monitoring the processing ensures that the second data portion is loaded to the internal memory at an appropriate stage.

The memory controller is preferably arranged to read data from the external memory and to write data to the internal memory, in order to write the data portions from the external memory to the internal memory.

In one preferred embodiment, each data portion in the external memory is substantially the same size as the internal memory. Thus, an entire data portion in the external memory can be written to the internal memory in one go.

Preferably, each data portion in the external memory is defined by a set of external data addresses. Preferably, data in the internal memory is defined by a set of internal data addresses. Preferably the total range of external data addresses is larger than the range of internal data addresses.

The set of external data addresses is preferably substantially the same size as the set of internal data addresses.

In that case, each external data address may be defined by x bits and each internal data address may be defined by (x-y) bits.

In that case, the memory controller may be arranged to discard y bits of the data address when writing data from the external memory to the internal memory. Thus, the external data address is automatically converted to an internal data address by discarding the appropriate number of bits.

In that case, the processor may be arranged, when processing the data portion in the internal memory, to try to read, for each data item in the first data portion, an address defined by x bits, and the internal memory may be arranged to convert the address defined by x bits to an internal memory address defined by (x-y) bits, by discarding the y most significant bits of the data address. Thus, although the processor tries to read an x-bit address (i.e. the instruction fetch is effectively for an external memory address), the internal memory discards the appropriate number of bits so that the address is converted to an internal memory address for the processor to read and no separate address reassignment is required.

In one embodiment, the data in the external memory is defined by external data addresses from 0X0000 to 0XFFFF and the data portions in the external memory are defined by the following sets of external data addresses: 0X0000 to 0X00FF, 0X0100 to 0X01FF, 0X0200 to 0X02FF and so on. In that embodiment, the data in the internal memory is defined by internal data addresses from 0X00 to 0XFF. Thus, each data portion in the external memory is the same size as the internal memory.

Preferably, every data portion in the external memory, irrespective of its external data address set, is mapped to a single set of internal data addresses in the internal memory. Thus, to convert from the data portion's external memory address to the internal memory address, some of the bits defining the address can simply be discarded. When each data portion is written from the external memory to the internal memory, no compiler effort is required in order to reassign addresses.

The selected data item is preferably defined by one or more of the internal data addresses in the set. The one or more internal data addresses defining the selected data item may be settable by a user.

The one or more of the internal data addresses defining the selected data item may be termed a threshold address. The threshold address may be the same for all the data portions or the threshold address may be different for different data portions.

In one embodiment, the first and second data portions are defined by a respective set of external data addresses, the second set of external data addresses following sequentially the first set of external data addresses.

In another embodiment, the first and second data portions are defined by a respective set of external data addresses, the second set of external data addresses not following sequentially the first set of external data addresses. In the case where the second set of external data addresses does not follow sequentially from the first set of external data addresses, the processor may be arranged, as it processes the first data portion, to supply information to the hardware module regarding the second set of external data addresses. Then, once the selected data item is processed, the hardware module may instruct the memory controller to load the second data portion, as defined by the second set of external data addresses.

According to the second aspect of the invention, there is also provided a semiconductor device for operation with an external memory, software in the external memory being arranged to be loaded into the internal memory in a plurality of software portions, each software portion in the external memory being defined by a respective set of external memory addresses, the semiconductor device comprising:
   an internal memory for storing a software portion, the software portion being defined by a set of internal memory addresses;
   a memory controller for writing software from the external memory to the internal memory;
   a processor for processing the software portion in the internal memory; and a hardware module arranged, once a selected software address in a first software portion is processed, to instruct the memory controller to write a second software portion from the external memory to the internal memory.

According to a third aspect of the invention, there is provided a hardware module for a semiconductor device, the semiconductor device being arranged for operation with an external memory, data in the external memory being arranged for flow in a plurality of data portions, the semiconductor device comprising an internal memory for storing a data portion, a memory controller for writing data from the external memory to the internal memory and a processor for processing the data portion in the internal memory; and the hardware module being arranged, once a selected data item in a first data portion is processed, to instruct the memory controller to write a second data portion from the external memory to the internal memory.

Preferably, each data portion in the external memory is defined by a set of external data addresses. Preferably, data in the internal memory is defined by a set of internal data addresses. Preferably the total range of external data addresses is larger than the range of internal data addresses.

Each set of external data addresses is preferably substantially the same size as the set of internal data addresses. In that case, each external data address may be defined by x bits and each internal data address may be defined by (x-y) bits.

In that case, the memory controller may be arranged to discard y bits of the data address when writing data from the external memory to the internal memory.

In that case, the processor may be arranged, when processing the data portion in the internal memory, to try to read, for each data item in the first data portion, an address defined by x bits, and the internal memory may be arranged to convert the address defined by x bits to an internal memory address defined by (x-y) bits, by discarding the y most significant bits of the data address.

In one embodiment, the data in the external memory is defined by external data addresses from 0X0000 to 0XFFFF and the data portions in the external memory are defined by the following sets of external data addresses: 0X0000 to 0X00FF, 0X0100 to 0X01FF, 0X0200 to 0X02FF and so on. In that embodiment, the data in the internal memory is defined by internal data addresses from 0X00 to 0XFF. Thus, each data portion in the external memory is the same size as the internal memory.

Preferably, every data portion in the external memory, irrespective of its external data address set, is mapped to a single set of internal data addresses in the internal memory. Thus, to convert from the data portion's external memory address to the internal memory address, some of the bits defining the address can simply be discarded. When each data portion is written from the external memory to the internal memory, no compiler effort is required in order to reassign addresses.

Advantageously, the selected data item is defined by one or more of the internal data addresses in the set. The hardware module is preferably arranged to monitor the instruction fetch address, that is the address in the internal memory currently being read by the processor. Once the one or more of the internal data addresses defining the selected data item matches the instruction fetch address, the hardware module can instruct the memory controller to load the next data portion to the internal memory.

The one or more internal data addresses defining the selected data item may be settable by a user.

The one or more of the internal data addresses defining the selected data item may be termed a threshold address. The threshold address may be the same for all the data portions or the threshold address may be different for different data portions.

In one embodiment, the first and second data portions are defined by a respective set of external data addresses, the second set of external data addresses following sequentially the first set of external data addresses. In that embodiment, where the second set of external data addresses follows sequentially from the first set of external data addresses, the hardware module can instruct the memory controller to write the next data portion to the internal memory.

In another embodiment, the first and second data portions are defined by a respective set of external data addresses, the second set of external data addresses not following sequentially the first set of external data addresses. In that embodiment, where the second set of external data addresses does not follow sequentially from the first set of external data addresses, the processor may be arranged, as it processes the first data portion, to supply information to the hardware module regarding the second set of external data addresses. Then, once the selected data item is processed, the hardware module may instruct the memory controller to load the second data portion, as defined by the second set of external data addresses.

According to the third aspect of the invention, there is also provided a hardware module for a semiconductor device, the semiconductor device being arranged for operation with an external memory, software in the external memory being arranged to be loaded into the internal memory in a plurality of software portions each software portion in the external memory being defined by a respective set of external memory addresses, the semiconductor device comprising an internal memory for storing a software portion, the software portion being defined by a set of internal memory addresses, a memory controller for writing data from the external memory to the internal memory and a processor for processing the software portion in the internal memory; and the hardware module being arranged, once a selected software address in a first software portion is processed, to instruct the memory controller to write a second software portion from the external memory to the internal memory.

Any features described in relation to one aspect of the invention may also be applicable to another aspect of the invention.

BRIEF DESCRIPTION OF THE DRAWINGS

An exemplary embodiment of the invention will now be described with reference to accompanying FIG. 1 which is a schematic diagram of a semiconductor device according to an embodiment of the invention.

DETAILED DESCRIPTION OF PREFERRED EMBODIMENT

FIG. 1 shows a silicon chip 101 according to an embodiment of the invention. Chip 101 includes an internal memory 103, a processor 105, a hardware module in the form of a memory address monitor 107 and an external memory controller 109. The external memory controller 109 has access to an external memory 111.

The addresses in the external memory are shown schematically at A and the addresses in the internal memory are shown schematically at B. As can be seen at A, in this embodiment, the external memory software addresses run from 0X0000 to 0XFFFF (hexadecimal) and are segmented into addresses running from 0X0000 to 0X00FF, 0X0100 to 0X01 FF, 0X0200 to 0X02FF, etc. As can be seen at B, the internal memory software addresses run from 0X00 to 0XFF only. That is, the external memory software addresses are defined by a 16 bit address whereas the internal memory software addresses are defined by an 8 bit address.

In general terms, operation of the arrangement of FIG. 1 is as follows. After power up, the external memory controller 109 loads the first segment of software from the external memory 111 into the internal memory 103. The processor 105 starts running and starts to process the first segment of software from the internal memory 103. The memory address monitor 107 monitors the software address which is currently being processed (i.e. the instruction fetch address) and, once the processor reaches a selected threshold, the indication is given from the memory address monitor 107 to the external memory controller 109 to load the second segment of the software from the external memory 111 to the internal memory 103. At that stage, the processor can start to process the second segment of software from the internal memory. Thus, the processing continues through the third, fourth, . . . , nth segments, the segments being loaded into the internal memory 103 one at a time on instruction of the memory address monitor 107.

Now consider the software addresses in the internal and external memories in more detail. As already described, the external memory 111 is divided into segments, the segments being decided by the memory address monitor 107. The addresses in the external memory run from 0X0000 to 0XFFFF and are segmented into addresses running from 0X0000 to 0X00FF, 0X0100 to 0X01 FF, 0X0200 to 0X02FF and so on, i.e., 16 bit addresses. The addresses in the internal memory run from 0X00 to 0XFF only, i.e., 8 bit addresses. Thus, the actual software addresses run from 0X0000 to 0XFFFF and are segmented into modules such that the modules in the external memory 111 are each the same size as the internal memory 103. There may be any number of segments in the external memory 111.

When the first segment from the external memory 111 (0X0000 to 0X00FF) is loaded into the internal memory 103, its addresses in the internal memory 103 become 0X00 to 0XFF. Similarly, when the second segment from the external memory 111 (0X0100 to 0X01FF) is loaded into the internal memory 103, its addresses in the internal memory 103 become 0X00 to 0XFF. This is the same for the remaining segments, as is shown below:

| Software segment | Actual software address map (i.e. in external memory 111) | Segmented software address map (i.e. in internal memory 103) |
| --- | --- | --- |
| 1 | 0X0000 to 0X00FF | 0X00 TO 0XFF |
| 2 | 0X0100 to 0X01FF | 0X00 TO 0XFF |
| 3 | 0X0200 to 0X02FF | 0X00 TO 0XFF |
| 4 | 0X0300 to 0X03FF | 0X00 TO 0XFF |
| . . . | . . . | . . . |
| 256 | 0XFF00 to 0XFFFF | 0X00 TO 0XFF |

Now, the software and processor 105 still use a 16 bit address line even when the segment is loaded into the internal memory 103, but the internal memory 103 uses only an 8 bit address line, so there is a mismatch. If we assume that the address boundaries for segmentation in the external memory are properly chosen to match the internal memory size exactly, this mismatch can be easily dealt with.

For example, if the processor 105 tries an instruction fetch on address 0X41AB (16 bit), the processor 105 issues address 0X41AB on its address bus and this address line goes to the internal memory 103. In the internal memory 103, this address line is reduced to 8 bits i.e. the values of bits 8, 9, 10, 11, 12, 13, 14, 15 are discarded. This is because no physical hardware address line for bits 8, 9, 10, 11, 12, 13, 14, 15 are implemented in the internal memory 103. So, the internal memory 103 will return read data for address 0XAB (8 bit), but this is exactly the address the processor 105 required for its instruction fetch, in any case. So, the processor 105 can process the data as if it were address 0X41AB and does not need to know about the bit reduction in the internal memory 103. So, as long as the segment size in the external memory 111 matches the internal memory size and the processor 105 supports an address range required by the original software before segmentation, this will work. Of course, this is only an example. The external memory addresses could be 12 bit and the internal memory addresses could be 8 bit, or the external memory addresses could be 16 bit and the internal memory addresses could be 12 bit (in which case the internal memory 103 would discard 4 bits) or any other suitable arrangement.

Thus, the memory segment size in the external memory 111 should fit into a neat address boundary so that the physical memory address used in a memory segment (the external memory address for the segment) always matches the offset address stored in the compiled object code (the segmented software address in the internal memory). Or, putting it another way, the segmented mapping in the internal memory address is the same for each segment of the external memory 111. Therefore the user should set the start address of each external memory software segment to the first address in the internal memory segment. Also, the user should limit the size of each software module to be the same size or smaller than the internal memory segment. In that way, no compiler effort is required in order to reassign addresses between the external and internal memories.

If one software block size (i.e. external memory address range) is less than the internal memory size, dummy code needs to be added at the end of the block so that the segment size matches the internal memory address size. This is done before software compilation to ensure that the first data item in the next segment sits on the correct segmentation boundary after software compilation.

Preferably, the internal memory size is the full range of one of 2 bit values, for example 0X00 to 0XFF, 0X000 to 0X1 FF or 0X0000 to 0X7FFF. If the internal memory size is not the full range, for example, 0X00 to 0XFC, this is still workable as long as the segmentation range in the external memory 111 is kept to 0X00 to 0XFF, with 0XFD to 0XFF remaining unused (i.e. dummy).

As already mentioned, the memory address monitor 107 detects when the internal memory segment can be replaced with a new program and, when this is the case, gives an indication to the external memory controller 109 to update the internal memory 103. Thus, when a given set of software addresses is loaded in the internal memory 103, the memory address monitor 107 monitors the software address being processed and, once that internal memory address reaches a given threshold (for example 0XE0), the memory address monitor 107 will give an indication to the external memory controller 109 to load the next segment from the external memory 111 to the internal memory 103. The detection will be done using a threshold value on the memory address. The threshold configuration can be set by a user and may be set for each segment or may be the same for all the segments.

The internal memory is a dual port memory so that the updating process (i.e. loading a new segment from the external memory) does not interrupt the processor's instruction fetch (i.e. the processor reading data from the internal memory). Because the internal memory 103 is dual port, it can be read out by the processor while, at the same time, it is written by the memory controller 109 with new contents. This is possible when the reading address, accessed by the processor 105, is on a higher address range in the internal memory 103 than the writing address, accessed by the external memory controller 109, the lower address range accessed by the external memory controller 109 already having been read out by the processor 105. Also, it is necessary that, while access to the two ports is taking place in parallel, the writing address does not overtake the reading address.

With regards to the threshold address, there will be a problem if the software code in one segment has a branch instruction (for example an instruction to move to processing a different segment or different portion of the same segment) which occurs before the threshold value. That way, the threshold address may be missed, so that the memory address monitor 107 never gives the instruction to load the next segment. To solve this problem, a rule in the software may be introduced so that any branch instruction may be moved to after the threshold address. In that way, the instruction will still be given to load the next segment, as the threshold address will be reached before the branch instruction is reached. This may involve adding some dummy cycles so that the instruction fetch address after the branch instruction does not overtake the address in the internal memory 103 which is being written to by the external memory controller 109 as it copies the next segment from the external memory 111 to the internal memory 103.

The segments in the external memory 111 need not be loaded into the internal memory 103 in sequence. The software in the internal memory 103 being processed by the processor 105 may provide an indication of the next memory segment to be loaded. The processor 105 is then able to give information to the memory address monitor 107 to select the next software segment to be loaded, by writing into a register inside the memory address monitor 107. Thus, as the memory address monitor 107 monitors the instruction fetch address, when the selected threshold is reached, the memory address monitor 107 will decide the next module to be loaded and will give the appropriate indication to the external memory controller 109.

The invention is suitable for software in which the flow can be segmented into smaller software modules, each module being the same size as the memory segment.

Thus, it will be seen from the above description that the invention solves the problem of internal memory size limitation by updating the internal memory dynamically whenever required, without slowing down the processing performance.

The invention claimed is:

1. A method for updating an internal memory on a semiconductor device from an external memory, data in the external memory being arranged for flow in a plurality of data portions, the method comprising:
writing a first data portion from the external memory to the internal memory;
processing the first data portion; and
while the first data portion is being processed, once a selected data item of the first data portion is processed, starting to write a second data portion from the external memory to the internal memory.

2. The method according to claim 1, further comprising while the first data portion is being processed, monitoring the processing for the selected data item.

3. The method according to claim 2, wherein monitoring the processing for the selected data item comprises a hardware module monitoring the processing for the selected data item.

4. The method according to claim 3, wherein the hardware module is on the semiconductor device.

5. The method according to claim 1, wherein writing a first data portion from the external memory to the internal memory comprises a memory controller writing the first data portion from the external memory to the internal memory.

6. The method according to claim 1, wherein the starting to write a second data portion from the external memory to the internal memory comprises a memory controller starting to write the second data portion from the external memory to the internal memory.

7. The method according to claim 5, wherein the memory controller is on the semiconductor device.

8. The method according to claim 1, wherein processing the first data portion comprises a processor processing the first data portion.

9. The method according to claim 8, wherein the processor is on the semiconductor device.

10. The method according to claim 1, wherein each data portion in the external memory is substantially the same size as the internal memory.

11. The method according to claim 1, wherein each data portion in the external memory is defined by a set of external data addresses.

12. The method according to claim 11, wherein data in the internal memory is defined by a set of internal data addresses.

13. The method according to claim 12, wherein each set of external data addresses is substantially the same size as the set of internal data addresses.

14. The method according to claim 13, wherein each external data address is defined by x bits and each internal data address is defined by (x-y) bits.

15. The method according to claim 14, wherein writing a first data portion from the external memory to the internal memory includes discarding y bits of the data address.

16. The method according to claim 14, wherein processing the first data portion comprises the steps of:
a processor trying to read, for each data item in the first data portion, an address defined by x bits;
converting the address defined by x bits to an internal memory address defined by (x-y) bits, by discarding the y most significant bits of the data address; and
the processor reading, for each data item in the first data portion, the internal memory address defined by (x-y) bits.

17. The method according to claim 12 wherein the selected data item is defined by one or more of the internal data addresses in the set.

18. The method according to claim 17, wherein the one or more of the internal data addresses defining the selected data item are set by a user.

19. The method according to claim 1, wherein the first and second data portions are defined by a respective set of external data addresses, the second set of external data addresses following sequentially the first set of external data addresses.

20. The method according to claim 1, wherein the first and second data portions are defined by a respective set of external data addresses, the second set of external data addresses not following sequentially the first set of external data addresses.

21. A semiconductor device for operation with an external memory, data in the external memory being arranged for flow in a plurality of data portions, the semiconductor device comprising:
an internal memory for storing a data portion;
a memory controller for writing data from the external memory to the internal memory;
a processor for processing the data portion in the internal memory; and
a hardware module arranged, once a selected data item in a first data portion is processed, to instruct the memory controller to write a second data portion from the external memory to the internal memory.

22. The semiconductor device according to claim 21, wherein the hardware module is arranged to monitor the processing for the selected data item.

23. The semiconductor device according to claim 21, wherein each data portion in the external memory is substantially the same size as the internal memory.

24. The semiconductor device according to claim 21, wherein each data portion in the external memory is defined by a set of external data addresses.

25. The semiconductor device according to claim 24, wherein data in the internal memory is defined by a set of internal data addresses.

26. The semiconductor device according to claim 25, wherein each set of external data addresses is substantially the same size as the set of internal data addresses.

27. The semiconductor device according to claim 26, wherein each external data address is defined by x bits and each internal data address is defined by (x-y) bits.

28. The semiconductor device according to claim 27, wherein the memory controller is arranged to discard y bits of the data address when writing data from the external memory to the internal memory.

29. The semiconductor device according to claim 27, wherein the processor is arranged, when processing the data portion in the internal memory, to try to read, for each data item in the first data portion, an address defined by x bits, and the internal memory is arranged to convert the address defined by x bits to an internal memory address defined by (x-y) bits, by discarding the y most significant bits of the data address.

30. The semiconductor device according to claim 25, wherein the selected data item is defined by one or more of the internal data addresses in the set.

31. The semiconductor device according to claim 30, wherein the one or more of the internal data addresses defining the selected data item can be set by a user.

32. The semiconductor device according to claim 21, wherein the first and second data portions are defined by a respective set of external data addresses, the second set of external data addresses following sequentially the first set of external data addresses.

33. The semiconductor device according to claim 21, wherein the first and second data portions are defined by a respective set of external data addresses, the second set of external data addresses not following sequentially the first set of external data addresses.

34. A hardware module for a semiconductor device, the semiconductor device being arranged for operation with an external memory, data in the external memory being arranged for flow in a plurality of data portions,
the semiconductor device comprising an internal memory for storing a data portion, a memory controller for writing data from the external memory to the internal memory and a processor for processing the data portion in the internal memory; and
the hardware module being arranged, once a selected data item in a first data portion is processed, to instruct the memory controller to write a second data portion from the external memory to the internal memory.

35. The hardware module according to claim 34, wherein each data portion in the external memory is defined by a set of external data addresses.

36. The hardware module according to claim 35, wherein data in the internal memory is defined by a set of internal data addresses.

37. The hardware module according to claim 36, wherein each set of external data addresses is substantially the same size as the set of internal data addresses.

38. The hardware module according to claim 37, wherein each external data address is defined by x bits and each internal data address is defined by (x-y) bits.

39. The hardware module according to claim 38, wherein the memory controller is arranged to discard y bits of the data address when writing data from the external memory to the internal memory.

40. The hardware module according to claim 38, wherein the processor is arranged, when processing the data portion in the internal memory, to try to read, for each data item in the first data portion, an address defined by x bits, and the internal memory is arranged to convert the address defined by x bits to an internal memory address defined by (x-y) bits, by discarding the y most significant bits of the data address.

41. The hardware module according to claim 36, wherein the selected data item is defined by one or more of the internal data addresses in the set.

42. The hardware module according to claim 41, wherein the one or more of the internal data addresses defining the selected data item can be set by a user.

43. The hardware module according to claim 34, wherein the first and second data portions are defined by a respective set of external data addresses, the second set of external data addresses following sequentially the first set of external data addresses.

44. The hardware module according to claim 34, wherein the first and second data portions are defined by a respective set of external data addresses, the second set of external data addresses not following sequentially the first set of external data addresses.

* * * * *